United States Patent
Pulley et al.

[11] Patent Number: 5,604,051
[45] Date of Patent: Feb. 18, 1997

[54] HIGH TEMPERATURE RECHARGEABLE CELL DESIGN

[76] Inventors: Christopher J. Pulley, 3726 Avalon Rd., Shaker Hts., Ohio 44120; Steven J. Specht, 711 Industrial Blvd., Valdosta, Ga. 31601; Geoffrey Barlow, 29 Daisy La., Chagrin Falls, Ohio 44022

[21] Appl. No.: 324,047

[22] Filed: Oct. 17, 1994

[51] Int. Cl.$^6$ .................................................. H01M 2/10
[52] U.S. Cl. ........................... 429/99; 429/96; 429/100; 429/149; 429/152; 429/157; 429/158; 429/160; 429/162; 429/163; 429/178; 429/181; 429/184; 429/185; 429/199; 429/245; 429/246
[58] Field of Search ............................... 429/102, 103, 429/16, 199, 245, 246, 149, 153, 161, 163, 181, 184, 99, 96, 100, 123, 152, 157, 158, 159, 160, 162, 178, 185

[56] References Cited

U.S. PATENT DOCUMENTS

| | | | |
|---|---|---|---|
| 3,909,301 | 9/1975 | Scheuk, Jr. | 429/181 |
| 4,060,667 | 11/1977 | Askew et al. | 429/199 |
| 4,306,004 | 12/1981 | Kaun et al. | 429/112 |
| 4,357,398 | 11/1982 | Nelson et al. | 429/94 |
| 4,401,714 | 8/1983 | Otto et al. | 429/245 |
| 4,508,797 | 4/1985 | Knoedler et al. | 429/181 |
| 4,540,642 | 9/1985 | Kaun | 429/131 |
| 4,904,551 | 2/1990 | Denoncourt et al. | 429/181 |
| 4,966,822 | 10/1990 | Johnston | 429/181 |
| 4,971,868 | 11/1990 | Tucholski et al. | 429/181 |
| 5,246,794 | 9/1993 | Blomgren et al. | 429/101 |
| 5,422,201 | 6/1995 | Georgopoulos | 429/181 |

*Primary Examiner*—Bruce F. Bell

[57] ABSTRACT

There is described an lithium—alloy/molten salt/metal sulfide electrochemical cell which eliminates the use of perforated baskets to restrain active materials and uses simple mechanical seal made from ceramic material. It also uses high melting point salt as the electrical insulator between the electrodes and the cell can. In the cell, the positive current collector is made from flexible graphite and a corrosion resistant metal. The cell is assembled in a low carbon steel case with side closure.

13 Claims, 1 Drawing Sheet

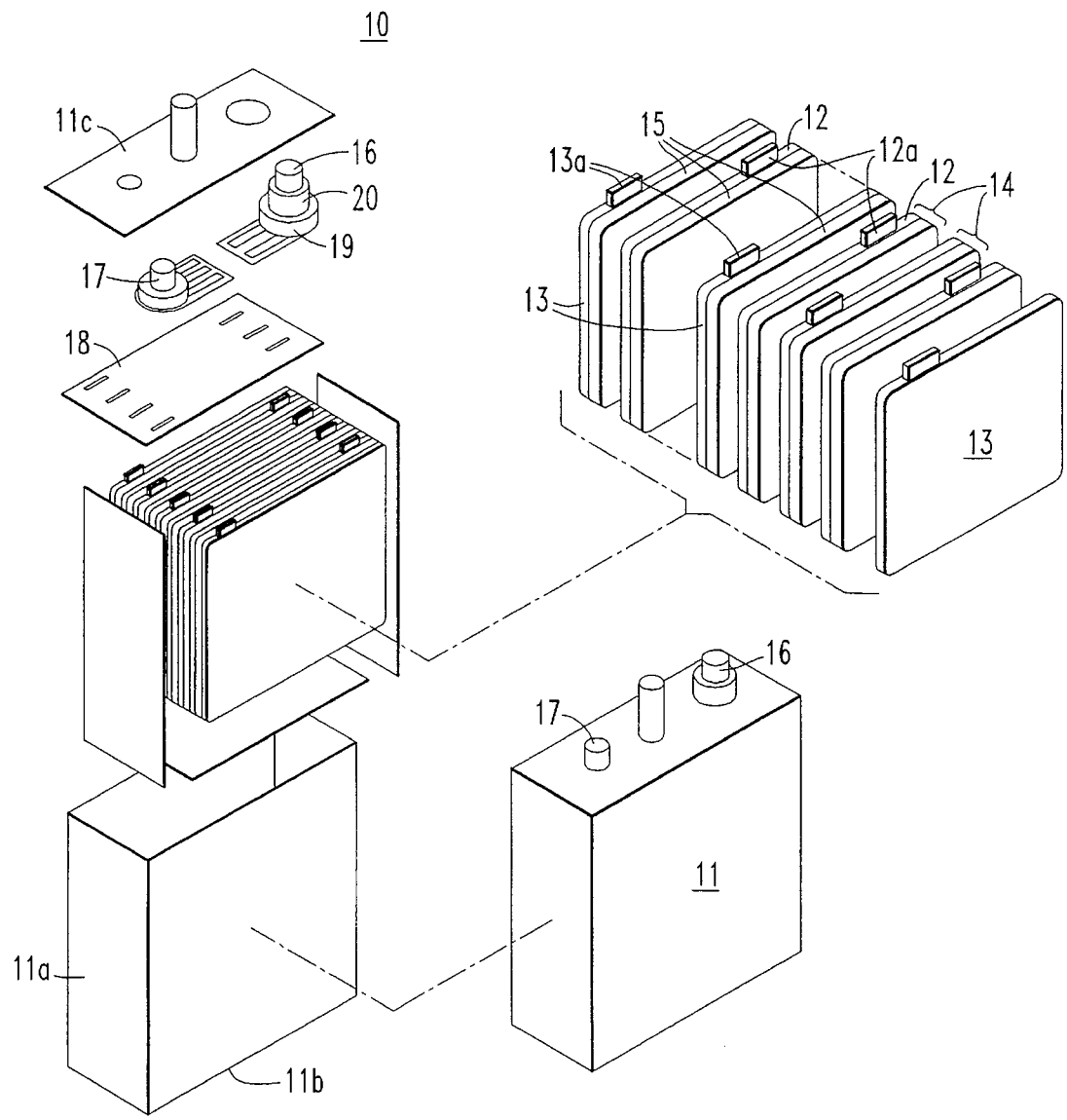

HIGH TEMPERATURE RECHARGEABLE CELL DESIGN

BACKGROUND OF THE INVENTION

1. Field of the Invention

This invention relates to lithium-alloy/molten salt/metal sulfide batteries. More particularly, the present invention relates to a new and novel cell design of lithium-alloy/molten salt/metal sulfide batteries without the use of costly materials utilizing simple fabrication techniques.

2. Description of the Prior Art

Lithium-alloy/metal sulfide batteries have positive and negative electrodes which are electrically insulated from one another by separators. Typically, the negative electrode material is lithium-alloy (generally LiAl), the positive electrode material is an iron sulfide (FeS or $FeS_2$) and the separators are formed of a fibrous boron nitride (BN) or a pressed powder magnesium oxide (MgO). An electrolyte such as a lithium chloride and potassium chloride mixture(LiCl-KCl)is normally infiltrated into the electrode materials and into the separators. The positive and negative current collectors are commonly formed of a conductive open mesh-like sheet or plate construction so as to confine the electrode materials while also allowing the migration of the electrolyte as required relative to the confined electrode materials. Full size batteries of this type are comprised of many cells, each having the construction noted above, that are housed together in a common battery housing and that are electrically connected in series to produce higher effective voltage output.

This type of battery or cell is designed to operate at temperatures in the range of 350°–500° C. The electrode materials and electrolyte are most corrosive in these temperatures. Accordingly, the current collectors must be formed from a corrosion-resistant, yet electrically-conductive, material. Moreover, the battery is designed to have an operating life in excess of 1000 "deep discharge" cycles, where each "deep discharge" cycle means discharging the fully charged battery down to approximately only a 20% charge level before recharging it again. During this deep discharge cycling, the positive and negative electrode materials undergo volumetric changes at different rates. This can shift the physically confining respective current collectors relative to one another within the battery cell or can even deform the collectors and/or cell housing. Also, nonuse of this type battery allows the operating temperatures of the electrolyte and electrode materials (each a paste-like liquid at the operating temperatures) to drop to temperatures at which they can freeze solid. These freeze-thaw cycles can also cause movement between the current collectors, electrode materials and cell housing.

U.S. Pat. No. 4,540,642 describes a lithium-alloy/iron sulfide cell wherein the lithium-alloy/iron sulfide cell having an open-ended cell housing having positive and negative electrode subassemblies that are nested within one another (the positive subassembly being located outwardly of the negative subassembly) and separator structure sandwiched between the subassemblies electrically insulating them from one another, and the subassemblies being fitted into the cell housing and defining cavities open respectively to the opposite open ends of the cell housing.

U.S. Pat. No. 4,357,398 illustrates the design of a secondary, high temperature electrochemical cell for use in lithium-alloy negative electrodes, transition metal chalcogenide positive electrodes and alkaline metal halide or alkaline earth-metal halide electrolyte.

U.S. Pat. No. 4,306,004 discloses an electrode structure for a secondary electrochemical cell in which the electrodes are separated by ceramic materials.

The cell designs as exemplified in the above patents, all require the use of costly materials as well as complex fabrication techniques which result in a high cost cell. The high costs of these cells prohibit their use in many commercial and consumer applications.

SUMMARY OF THE INVENTION

In accordance with the present invention, there is provided a high temperature rechargeable electrochemical cell, which comprises the elimination of many parts used in the manufacture of cells as disclosed in previous designs, substituting higher cost materials with lower cost materials. The present invention also encompasses cell components which can be manufactured in high quantities at a lower cost and adaptable to be assembled by automated equipment. These cells typically are housed together in a housing and they are connected in series to form a battery.

Thus, the present invention allows the fabrication of a cell without the use of perforated baskets which have been used to restrain active metals. A simple mechanical seal is used for the positive terminal, in lieu of expensive packed powder such as boron nitride. A high melting point salt as the electrical insulator between the electrodes and the cell can. The positive current collector made from flexible graphite and a corrosion resistant material. Low cost materials such as low carbon steel are used for the battery case and a low cost connection is made between the positive electrode tab and the positive terminal. The intercell connector which electrically joins adjacent cells can also be made of low carbon steel.

Other objects and advantages of the present invention will become more apparent from the following description and the figures.

DESCRIPTION OF THE FIGURES

The present invention will be better understood from the following description of the preferred embodiments of the present invention together with the accompanying drawings wherein:

FIG. 1 is an exploded view of an Li/Al/$FeS_2$ prismatic cell formed in accordance with the present invention.

DESCRIPTION OF THE INVENTION

FIG. 1 is a cutaway view illustrating a Li/Al/$FeS_2$ multiplate prismatic cell 10 according to the present invention. This cell 10 comprises a sealed cell can 11 having an opposite pair of side walls 11a bottom wall 11b and a removable top 11c adapted to receive positive electrode 12 and negative electrode 13. A plurality of individual plates, $14_1, 14_2, \ldots 14_n$, are stacked together within the can 11 and electrically insulated from each other by ceramic separators $15_1, 15_2, \ldots 15_{n-1}$. Intercell connector 21 formed from low carbon steel electrically joins adjacent cells 10.

Insulation 22 comprising a high melting salt is located between the top 11c and the electrodes 12 and 13. The melting point of this salt must be greater than the operating temperature of the battery. Suitable high temperature salts include alkali halides such as lithium fluoride, lithium chloride, lithium bromide, lithium iodide, sodium fluoride, sodium chloride, sodium bromide, sodium iodide, potassium fluoride, potassium chloride, potassium bromide, potassium iodide, and combinations thereof.

External positive and negative electrodes 12a and 13a are provided on each of the plates $14_1$, $14_2$, ... $14_n$, which are electrically joined forming positive and negative terminals 16 and 17, respectively.

A positive current collector 18 conducts current from the positive electrodes 12 to the positive terminal 16. A negative current collector, which is integral with the cell can 11, conducts current from the negative electrodes 13.

As illustrated, the positive terminal 16 has a flexible insulating seal 19 electrically insulated on its external surface sandwiching a ceramic bushing 20 and compressively sealed together. Our co-pending patent application Ser. No. 08/323,980, filed Oct. 17, 1994, (Westinghouse Case No. 58,159) hereby incorporated herein by reference, describes suitable electrical connectors which can be used in the present invention.

The negative terminal 17 is in intimate contact with cell can 11 and thereby forms as an integral part of the cell can 11. The cell can 11 is in contact with the outer negative electrodes 13a and is mechanically attached to the center negative, current collector. The negative terminal 17 is welded to the steel can 11 which collects current from all the negative electrodes.

With respect to how the cell might be assembled, the electrodes, separators and current collectors are stacked into the cell can halves and then the feedthru seal assembly is attached. The two can halves are then joined by welding to form a sealed metal container for the cell components. As the cell is heated the electrode melts and becomes ionically conductive while preventing electronic conduction. This activates the cell and allows the cell to be charged and discharged repeatedly as long as the temperature remains above the melting point of the electrolyte salt. Alternatively, the cell can 11 can be formed in accordance with our co-pending patent application Ser. No. 08/323,979, filed Oct. 17, 1994, (Westinghouse Case No. 58,162) hereby incorporated herein by reference, to allow for ease of insertion of the electrode plates into the cell can 11.

The ceramic separator 15 is preferably formed of material such as pressed ceramic powders, sintered ceramic powders of fibrous ceramic cloth or felt. The bushing 20 is preferably formed of material such as aluminum nitride, magnesium oxide, yttria and beryllia.

The flexible insulating seal 19 can be formed of any flexible material capable of remaining compliant at the cell operating temperature. A preferred material is flexible graphite, such as that sold under the tradename GRAFOIL.

As to the positive electrode 12, it should be a solid at operating temperature and can be formed from sulfides of a transition metal and mixtures thereof. The transition metals that can be used include iron, nickel, and cobalt. In addition, sulfides of chromium or molybdenum can also be used. The negative electrode 13 is also desirably a solid at operating temperature and alloys of lithium are preferable. These include lithium aluminum or lithium silicon.

The electrolyte for the cell is preferably a molten salt, typically a eutectic or near eutectic composition containing a mixture of lithium halides and potassium halides.

In the foregoing specification, certain preferred practices and embodiments of this invention have been set out. However, it will be understood that the invention may be otherwise embodied within the scope of the following claims.

We claim:

1. A lithium-alloy/molten salt/metal sulfide electrochemical cell comprises the combination of:
   a. a cell can formed from low carbon steel;
   b. at least one plate provided within said cell can, said at least one plate being positive, said positive plate including at least one positive electrode, said positive electrode being insulated from said can by a high melting point salt, said positive electrode being electrically connected to a positive terminal;
   c. at least one negative electrode connected separately to a terminal on said can, said negative electrode and said positive electrode being electrically insulated from each other by a ceramic separator;
   d. said positive terminal having a flexible insulating seal electrically insulated on its exterior surface sandwiching a ceramic bushing and compressively sealed together, said seal being formed from flexible graphite having an exterior surface, said flexible graphite having a layer of electrically insulative material provided on said exterior surface;
   e. a generally planar positive current collector operably connecting to said positive electrode;
   f. said negative electrode being an integral part of said cell; and
   g. an intercell connector formed from low carbon steel, said intercell connector electrically joining adjacent cells.

2. A cell according to claim 1 wherein said ceramic separator comprises a material selected from the group consisting of pressed ceramic powders, sintered ceramic powders of fibrous ceramic cloth and felt.

3. A cell according to claim 1 wherein said bushing comprises a material selected from the group consisting of aluminum nitride, magnesium oxide, yttria and beryllia.

4. A cell according to claim 1 wherein said positive current collector comprises a flexible graphite and a corrosion resistant material.

5. A cell according to claim 1 wherein the positive terminal is pinned to the tab of the positive current collector.

6. A cell according to claim 1 in which each of the positive electrode and the negative electrode is a solid at operating temperature.

7. A cell according to claim 6 wherein said positive electrode is a material selected from the group consisting of sulfides of a transition metal, sulfides of chromium, sulfides of molybdenum, and mixtures thereof.

8. A cell according to claim 7 wherein said transition metal is selected from the group consisting of iron, nickel, and cobalt.

9. A cell according to claim 6 wherein said negative electrode is a lithium alloy.

10. A cell according to claim 9 wherein said lithium-alloy is one of lithium aluminum, lithium-silicon, and mixtures thereof.

11. A cell according to claim 1 wherein the electrolyte is a molten salt.

12. A cell according to claim 11 wherein the salt is a eutectic composition comprising at least one alkali halide.

13. The cell according to claim 12 wherein said alkali halide is selected from the group consisting of lithium chloride, lithium bromide, potassium bromide, lithium fluoride,, lithium iodide, sodium fluoride, sodium chloride, sodium bromide, sodium iodide, potassium fluoride, potassium chloride, potassium iodide, and mixtures thereof.

* * * * *